United States Patent [19]

Kuehl

[11] 4,139,327
[45] Feb. 13, 1979

[54] ROUGHING GEAR SHAPER CUTTER

[75] Inventor: Ronald J. Kuehl, Rockford, Ill.

[73] Assignee: Barber-Colman Company, Rockford, Ill.

[21] Appl. No.: 807,087

[22] Filed: Jun. 16, 1977

[51] Int. Cl.$^2$ ............................................. B26D 1/12
[52] U.S. Cl. ......................................... 407/28; 407/26
[58] Field of Search ....................... 407/20, 23, 24, 25, 407/26, 27, 28, 29

[56] References Cited

U.S. PATENT DOCUMENTS

| 676,226 | 6/1901 | Fellows | 407/28 |
| 3,371,395 | 3/1968 | Wildhaber | 407/28 |
| 3,892,022 | 7/1975 | Johnson | 29/103 B |

*Primary Examiner*—Harrison L. Hinson
*Attorney, Agent, or Firm*—A. Richard Koch

[57] ABSTRACT

A gear shaper cutter for generating rough shapes has an undulating cutting edge profile to leave alternating heavy and light sections of material to be removed from the rough shape in a finishing operation. Chips are, as a result, more easily broken during the subsequent finishing operation to provide better heat dissipation and longer finishing tool life.

6 Claims, 7 Drawing Figures

ROUGHING GEAR SHAPER CUTTER

BACKGROUND OF THE INVENTION

This invention relates to roughing gear shaper cutters used for roughly generating gears, sprockets, splines, cams and like shapes by reciprocation. Roughing cutters are used to remove large amounts of stock quickly from the workpiece until the desired profile is approximated, after which a finishing cutter removes the remaining stock in small amounts to produce the desired profile with a smooth finish. Such a procedure saves time and increases the life of the highly refined and relatively expensive finishing cutter. The profile of the roughly cut shapes is dependent upon the profile of the cutting edges on the roughing cutter. In the past the roughing cutter had a profile designed to leave a substantially uniform amount of stock to be removed in a finishing operation to produce the desired shape. Stuart J. Johnson, in U.S. Pat. No. 3,892,022 issued on July 1, 1975, disclosed that a roughing hob having undulating cutting edges left alternating heavy and light sections of stock to be removed in a finishing operation. During the subsequent finishing operation, chips were more easily broken, reducing the temperature at the cutting edge of the finishing tool and thus increasing the life of the finishing tool and reducing the energy consumed in the operation.

In generating a shape, a hob cuts by rotating about its axis teeth having cutting edges lying in substantially radial planes. In order to provide clearance, the teeth are backed off from the cutting edges in such a manner that, as the hob is repeatedly sharpened, the profiles generated on work pieces by the successively created cutting edges remain constant even though the diameter of the hob is reduced by sharpening.

A gear shaper cutter, in contrast, generates a shape primarily by reciprocation. The cutting is accomplished by radial teeth having cutting edges lying substantially in a plane perpendicular to the axis of the cutter. In order to provide the necessary clearance these teeth are tapered back from the cutting edge at each point along the cutting edge. When the cutter is sharpened, its diameter changes, protuberances in the cutting edge become smaller and recessed in the cutting edge become larger. As a result, the shape generated is altered not only by the change in diameter, but also by the change in the contour of the cutting edge. Johnson's teachings about undulating cutting edges on hobs were, therefore, not applicable to gear shaper cutters, because their contours do not remain constant.

SUMMARY OF THE INVENTION

This invention provides an undulating cutting edge on gear shaping cutters used to generate rough shapes, the undulations leaving alternating heavy and light sections to be removed in a subsequent finishing operation. Although the profile of the cutting edge changes with each sharpening of the cutter, the generated rough shape remains unchanged. Limitations are established upon the undulations to assure production of the desired alternating heavy and light sections on the rough shape.

By employing roughing gear shaper cutters made in accordance with this invention the number of shapes that can be finished before resharpening of the finishing tool is increased, resulting in a saving of time required for resharpening and in increasing the life of the finishing tool. The power expended in the finishing operation is reduced, thus reducing its cost.

DESCRIPTION OF THE PREFERRED EMBODIMENT

The term "gear shaper cutter" is not confined to shaper cutters for producing gears, but applies to shaper cutters employed to generate gears, sprockets, splines, cams and like shapes. The term is used in this broad sense throughout this application.

Figure 1:
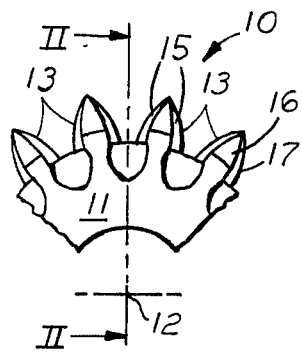
FIG. 1 is a plan view of a portion of a gear shaper cutter usable to generate teeth on a gear.
Figure 2:
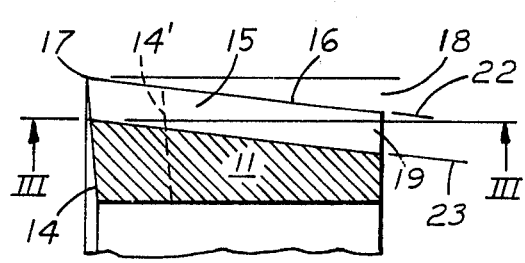
FIG. 2 is a cross-section of the cutter in FIG. 1 taken along the line II—II.
Figure 3:
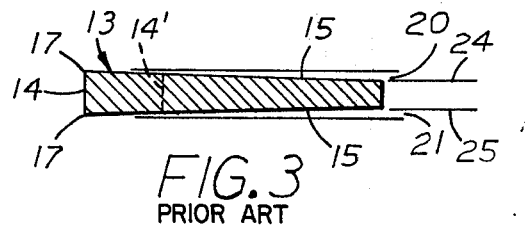
FIG. 3 is a cross-section of one cutting tooth of the cutter in FIG. 2 taken along the line III—III.

FIG. 1, 2 and 3 show a portion of a typical conventional gear shaping cutter 10 usable to generate involute gears with either external or internal teeth. The cutter comprises an annular body 11 having an axis of rotation and reciprocation 12. A plurality of relieved cutting teeth 13 extend radially outward from the body. A cutting face 14 on one axial end of the cutter intersects the sides of the cutter, comprising faces 15 and ends 16 of the teeth, to provide a cutting edge 17 having a profile on the cutting face such as will, when the cutter is reciprocated and rotated in synchronism with movement of a blank being cut, generate the desired involute teeth on the blank. In order to provide cutting clearances 18, 19, 20, 21, the teeth 13 must be relieved behind the cutting face 14, as for example along lines 22, 23, 24, 25 extending back from the cutting edge 17. It will be obvious that as the shaper cutter is sharpened, translating the cutting face 14 axially as to 14', the teeth 13 at any given radius will become narrower and the profile of the cutting edge will change.

Figure 4:
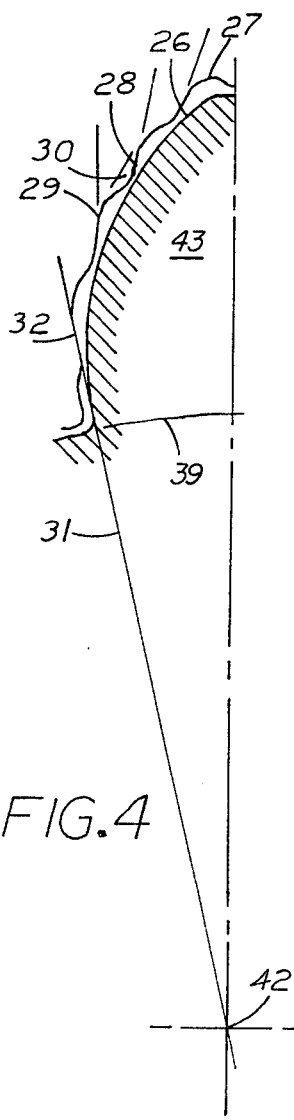
FIG. 4 is a sketch showing a desired relationship between the profile generated by a roughing gear shaper cutter according to this invention and the desired finished profile produced by a finishing operation.

FIG. 4 shows a desired finished profile 26 of a gear tooth 43 and an undulating rough profile 27 generated by a roughing gear shaper cutter according to this invention. The space between the desired finished profile 26 and the closest approach of the rough profile 27 at depth 28 represents the minimum amount of material to be removed in the finishing operation. The distance between the desired finished profile 26 and the farthest portion of the rough profile at peak 29 represents the maximum amount of material to be removed in the finishing operation. The difference between the depth 28 and peak 29 is the height 30 of the undulation. It has been found that for best results the height 30 of the undulations should be between approximately 50 and 75 percent of the maximum amount of material to be removed in the finishing operation.

In order to generate a desired rough profile on the work piece, it is necessary to avoid undercutting. For this reason every radius 31 from center 42 through any point 32 on the profile 27 must not cross the profile 27 more than once. In the generation of involute shapes, this limitation applies only to those portions of the profile above the base circle 29. As a result the undulations must be relatively shallow with respect to their length.

Figure 5:
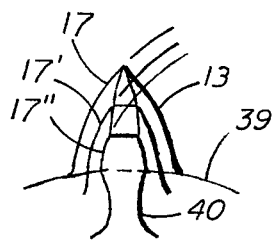
FIG. 5 is a sketch of an involute gear shaper cutter tooth, showing the relationship of the profiles produced as it is sharpened.
Figure 6:
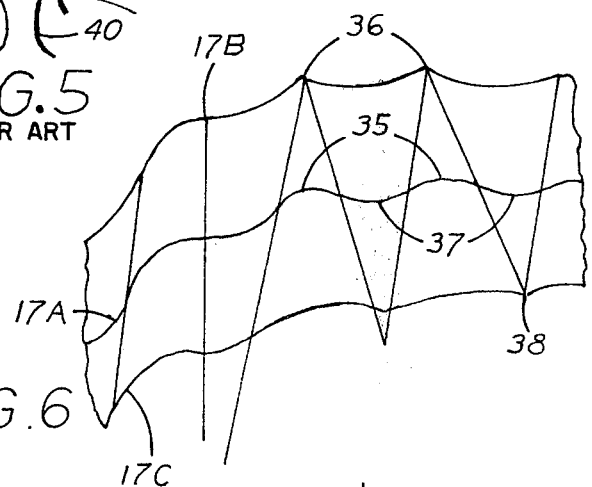
FIG. 6 is a sketch of a portion of the profile of a gear shaper cutter according to the teachings of this invention.

FIG. 5 shows how the successive cutting edges 17, 17', 17'', formed as the cutting face 14 of gear 13 is successively translated by sharpening, form parts of a family of identical involute curves above base circle 39, but do not conform below the base circle. Such a cutter is useful for generating involute gears and the like until the portion above the base circle 39 disappears. The undercut portion 40 below the baseline does no cutting, but provides clearance. If such an undercut portion extends above the base circle, the profile of the shape being cut will be altered. This also applies to the undulations on the profiles of the cutting edges. When the undulation falls below the base circle it is ineffective to produce the desired configuration. It should therefore extend for the useful cutting thickness of the cutter above the base circle. The only known practical method for producing rough gear shaper cutters is by generation, such as by hobs made in accordance with the teaching of said U.S. Pat. No. 3,892,022. They may also be produced by a single point cutter, but that is impractical. When a roughing gear shaper cutter is hobbed, each undulation begins at the cutting face and extends backward therefrom. When the roughing gear shaper cutter is hobbed, the undulations are involute curves. It is desirable to have the optimum profile on each cutting face, but this is impossible for successive cutting faces as the cutter successively resharpened. For this reason the optimum profile should be obtained at the cutting face produced when half of the useful life of the cutter has passed. Using this cutting face as a reference, the concave portions of the profile on convex portions of the tooth will have progressively larger radii and the convex portions will have progressively smaller radii as the initial cutting face is approached. The theoretical limit is reached when the convex radii become zero, at which time cusps are formed and after which it is no longer possible to generate the desired undulating profile on the workpiece. From a practical standpoint it may be desirable not to go this far, since small radius projections are easily broken. FIG. 6 shows a desired profile at cutting edge 17A with smooth undulations and an undesirable initial cutting edge 17B on which two of the convex portions 35 have become cusps 36. At the other extreme, the profile at cutting edge 17C shows how the radii of concave portions 37 become smaller as the cutter is sharpened until they become zero forming a cusp 38, which is almost impossible to form. Beyond the limiting conditions, at which cusps are formed, the desired undulations could not be generated on the work piece.

Figure 7:
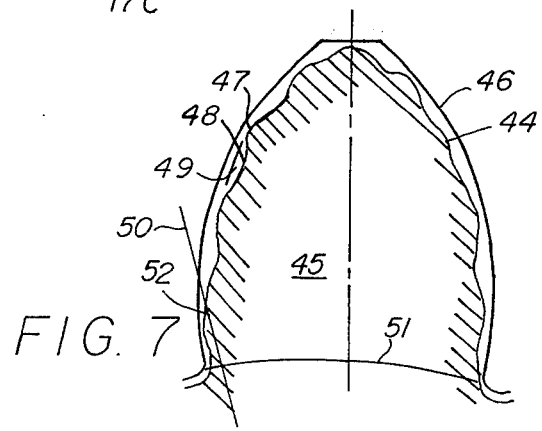
FIG. 7 is a profile of a tooth of a roughing gear shaper cutter made according to this invention.

FIG. 7 shows the undulating profile 44 of a tooth 45 of a roughing gear shaper cutter required to produce the desired rough profile 27 on the gear tooth 43 shown in FIG. 4. The limitations on the undulating profile 44 of the roughing cutter are similar to those for the undulating profile 27 of the rough gear to be produced thereby. The profile 46 of a tooth on a finishing gear shaper cutter for the finished gear 43 is taken as a reference. The minimum distance between the finishing cutter profile 46 and any peak 47 on the roughing cutter profile 44 determines the least material to be removed from gear tooth 43 in the finishing operation. The maximum distance between the finishing cutter profile 46 and any valley 48 on the roughing cutter profile 44 determines the most material to be removed from gear tooth 43 in the finishing operation. In order to provide the desired amounts of material to be removed from gear tooth 43 in the finishing operation, similar relationships must be provided by the roughing gear shaper cutter. The height 49 of the undulations on the roughing cutter should preferrably be between approximately 50 and 75 percent of the maximum distance between the valleys 48 on the roughing cutter and the profile 46 of the finishing cutter. In order to prevent undercutting, every radius 50 from the center of base circle 51 through any point 52 on profile 45 must not cross the profile 45 more than once. This limitation applies only to those portions of the profile 44 above the base circle 51. The undulations should be relatively shallow with respect to their length in order to strengthen the cutting edges and to increase the useful life of the cutter, as described in connection with FIG. 6.

The drawings are not necessarily to scale. The amounts of material to be removed by a finishing operation, as shown in FIG. 4, have been deliberately exaggerated in order to make the description more clearly apparent. The relief shown in FIGS. 2 and 3 is arbitrary.

I claim:

1. A roughing gear shaper cutter for generating from a blank by relative synchronized axial reciprocation and rotation a rough shape having a plurality of alternating heavy and light sections to be removed in a subsequent finishing operation, said cutter comprising a body having an axis of reciprocation, a cutting face on one axial end of said body, sides on the body intersecting said cutting face to form a cutting edge, said sides relieved behind the cutting edge to provide cutting clearance and characterized by each cutting edge formed by successive axial translations of said cutting face comprising a plurality of undulations adapted to generate the alternating heavy and light sections on said rough shape, wherein said plurality of undulations comprises a series of continuous involute curves.

2. A gear shaper cutter according to claim 1 wherein said cutter is an involute gear cutter having a base circle, and each of said undulations extends laterally throughout the useful cutting thickness of said tooth above the base circle.

3. A gear shaper cutter according to claim 1 wherein the depth of said undulations is approximately 50 to 75 percent of the distance between a valley envelope of said undulations and the desired finished shape profile.

4. A gear shaper cutter according to claim 1 wherein said undulations are relatively shallow with respect to their length.

5. A gear shaper cutter according to claim 1 wherein said cutting edge takes the form of a plurality of substantially identical teeth.

6. A gear shaper cutter according to claim 1 wherein said cutter is an involute gear cutter having a base circle, and a radius from the axis through any point on the cutting edge crosses said cutting edge only once above the base circle.

* * * * *

UNITED STATES PATENT OFFICE
CERTIFICATE OF CORRECTION

Patent No. 4,139,327  Dated February 13, 1979

Inventor(s) Ronald J. Kuehl

It is certified that error appears in the above-identified patent and that said Letters Patent are hereby corrected as shown below:

Column 1, line 46, change "recessed" to --recesses--.

Column 3, line 5, change "29" to --39--.

Column 4, line 17, change "45" to --44--.

Column 4, line 18, change "45" to --44--.

Signed and Sealed this

Eighth Day of May 1979

[SEAL]

Attest:

RUTH C. MASON
Attesting Officer

DONALD W. BANNER
Commissioner of Patents and Trademarks